United States Patent
Schmittner et al.

(10) Patent No.: US 11,574,555 B2
(45) Date of Patent: Feb. 7, 2023

(54) ASSISTANCE DEVICE AND METHOD OF OPERATING AN ASSISTANCE DEVICE

(71) Applicant: Festo SE & Co. KG, Esslingen (DE)

(72) Inventors: Manuel Schmittner, Altbach (DE); Johannes Volzer, Heroldstatt (DE)

(73) Assignee: Festo SE & Co. KG, Esslingen (DE)

( * ) Notice: Subject to any disclaimer, the term of this patent is extended or adjusted under 35 U.S.C. 154(b) by 296 days.

(21) Appl. No.: 16/826,813

(22) Filed: Mar. 23, 2020

(65) Prior Publication Data
US 2020/0312184 A1    Oct. 1, 2020

(30) Foreign Application Priority Data
Mar. 26, 2019  (DE) .......................... 102019204167.1

(51) Int. Cl.
*G09B 5/02* (2006.01)
*G09B 19/00* (2006.01)
*G08B 21/18* (2006.01)
*G08B 5/36* (2006.01)

(52) U.S. Cl.
CPC ............. *G09B 19/003* (2013.01); *G08B 5/36* (2013.01); *G08B 21/182* (2013.01); *G09B 5/02* (2013.01)

(58) Field of Classification Search
None
See application file for complete search history.

(56) References Cited

U.S. PATENT DOCUMENTS

2008/0109745 A1*  5/2008  Zhang .................. F15B 19/007
                                                    703/7

FOREIGN PATENT DOCUMENTS

DE    102014220166 B4    11/2017
WO    WO 96/31704         10/1996

OTHER PUBLICATIONS

Patent Translate, Description DE 102014220166BR; Machine translation date: Apr. 9, 2022; Total No. pp. 13.*
"CAT—Cushioning Adjustment Tool" by Aventics GmbH, https://www.aventics.com/en/products/pneumatic-products, 6 pages.

* cited by examiner

*Primary Examiner* — Bruk A Gebremichael
(74) *Attorney, Agent, or Firm* — Hoffmann & Baron, LLP

(57) ABSTRACT

An assistance device (10) for assisting in the adjustment of a damping choke (1) of a fluidic actuator (30), wherein the assistance device (10) includes a display arrangement (3) and is adapted to determine an adjustment recommendation for the adjustment of the damping choke (1) on the basis of a detected movement of an actuator member (4) of the fluidic actuator (30) and to display the adjustment recommendation via the display arrangement (3), and the assistance device (10) is further adapted to determine, based on the movement of the actuator member (4), operational safety information based on kinetic energy related to the movement of the actuator member (4), and to display the operational safety information via the display arrangement (3).

17 Claims, 4 Drawing Sheets

ASSISTANCE DEVICE AND METHOD OF OPERATING AN ASSISTANCE DEVICE

BACKGROUND OF THE INVENTION

The invention relates to an assistance device for assisting in the adjustment of a damping choke of a fluidic actuator. The assistance device comprises a display arrangement. The assistance device is adapted to determine an adjustment recommendation for the adjustment of the damping choke on the basis of a detected movement of an actuator member of the fluidic actuator and to display the adjustment recommendation via the display arrangement.

From the company Aventics GmbH the product "CAT—Cushioning Adjustment Tool" is available, with which an adjustment recommendation can be determined and displayed.

SUMMARY OF THE INVENTION

It is an object of the invention to modify the assistance device in such a way as to enable safe operation of the fluidic actuator.

The object is solved by an assistance device adapted to determine, on the basis of the movement of the actuator member, operational safety information based on kinetic energy related to the movement of the actuator member and to display the operational safety information via the display arrangement.

The invention further pertains to a method of operating an assistance device described above. The method comprises the steps of: detecting a movement of the actuator member, determining, based on the detected movement of the actuator, the operational safety information, and displaying the operational safety information on the display arrangement.

The method is expediently adapted in correspondence to a further embodiment of the system.

BRIEF DESCRIPTION OF THE DRAWINGS

In the following, exemplary details and exemplary embodiments are explained with reference to the figures. Thereby shows.

DETAILED DESCRIPTION

Figure 1:
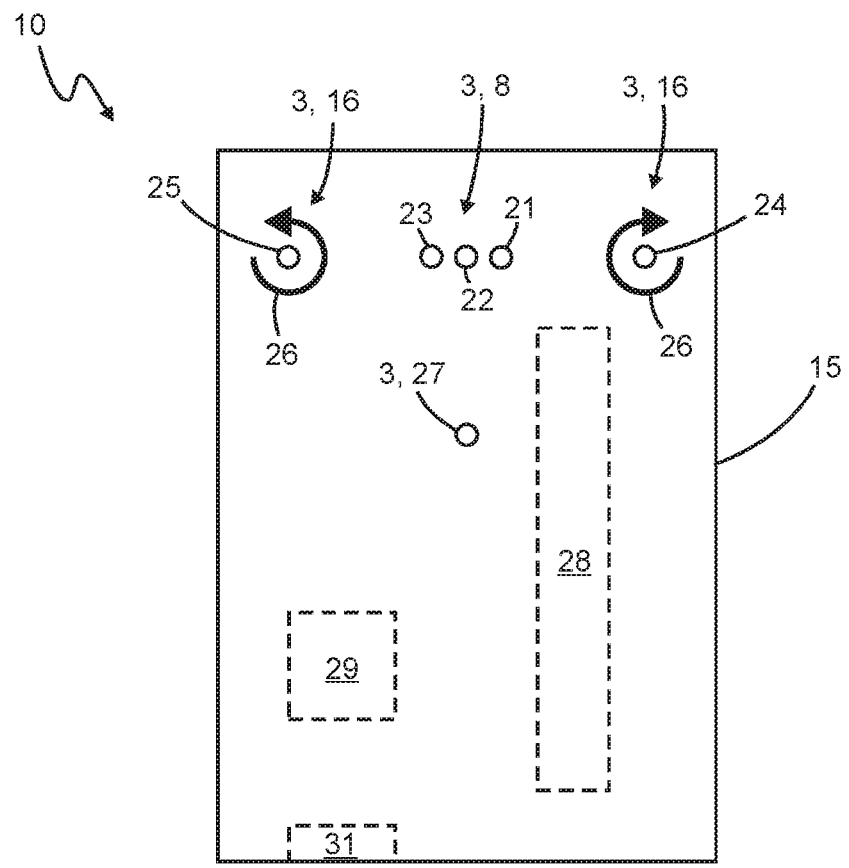
FIG. 1 a schematic view of an assistance device.

FIG. 1 shows a top view of an exemplary embodiment of an assistance device 10.

Figure 2:
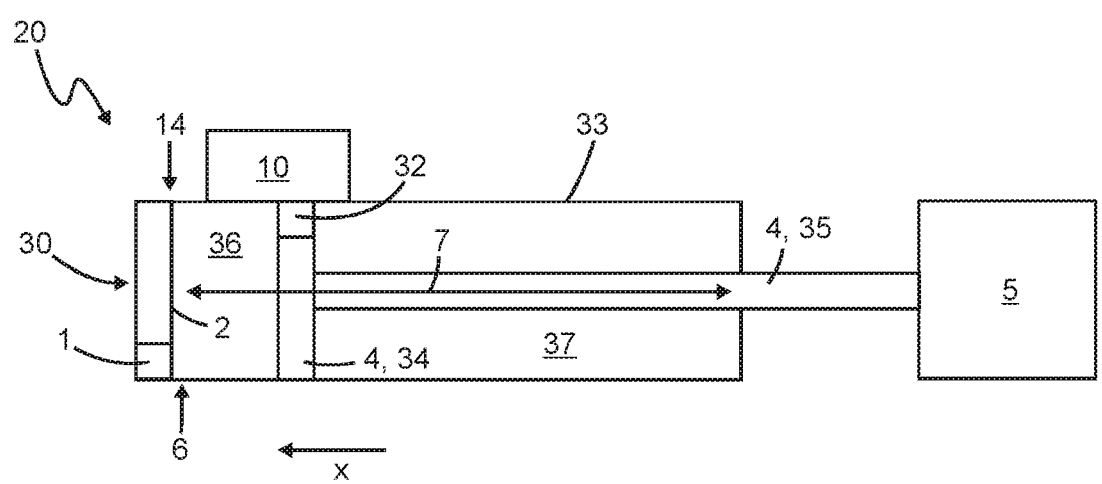
FIG. 2 a schematic view of an assembly comprising an assistance device and a fluidic actuator with a damping choke, FIG. 3 a first decision diagram for determining an operational safety information, FIG. 4 a second decision diagram for determining an adjustment recommendation, FIG. 5 a procedure for obtaining state information, FIG. 6 a velocity curve with a local minimum, FIG. 7 a velocity curve with a rebound before an end position, and FIG. 8 a velocity curve with a rebound in an end position.

The assistance device 10 serves to assist a user in adjusting a damping choke 1 of a fluidic actuator 30 (e.g. shown in FIG. 2).

The assistance device 10 comprises a display arrangement 3. The assistance device 10 is adapted to determine an adjustment recommendation for the adjustment of the damping choke 1 on the basis of a detected movement of an actuator member 4 of the fluidic actuator 30 and to display the adjustment recommendation via the display arrangement 3.

The assistance device 10 is further adapted to determine operational safety information based on the movement of the actuator member 4. The operational safety information is based on kinetic energy related to the movement of the actuator member 4. The assistance device 10 is adapted to display the operational safety information via the display arrangement 3.

Further exemplary details are explained below.

The assistance device 10 is designed as a portable device. The assistance device 10 serves to be placed, in particular fixed, to the fluidic actuator 30 by a user, to detect the movement of the actuator member 4 of the fluidic actuator 30 and to determine and display the adjustment recommendation and operational safety information on the basis of the detected movement. The user can then adjust the damping choke 1 of the fluidic actuator 30. In addition, the user can judge, on the basis of the operational safety information, how safe the operation of the fluidic actuator 30 is. In particular, the user can then readjust the damping choke 1 or decide that the operation of the fluidic actuator 30 is not safe and, for example, stop operation.

The assistance device 10 can then expediently be removed from the fluidic actuator 30 and used in the adjustment of a damping choke of another fluidic actuator.

The assistance device 10 comprises a device housing 15, which is designed in particular as the outer housing of the assistance device 10. The assistance device 10 has an exemplary cuboid basic shape. The assistance device 10 preferably comprises a mechanical interface (not shown in the figures) for detachable attachment of the assistance device 10 to the fluidic actuator 30. The mechanical interface is located in particular on the underside of the device housing 15.

The assistance device 10 has the display arrangement 3, which is exemplarily arranged on the upper side of the assistance device 10, especially on the upper side of the device housing 15. The display arrangement 3 is located on the outside of the instrument housing 15.

The display arrangement 3 comprises an operational safety display 8 for displaying the operational safety information and an adjustment recommendation display for displaying the adjustment recommendation.

As an example, the operational safety display 8 comprises three LEDs, in particular exactly three LEDs. The operational safety display 8 comprises exemplarily a first operational safety LED 21, a second operational safety LED 22 and a third operational safety LED 23.

The assistance device 10, in particular the operational safety display, is adapted to display the operational safety information as one of exactly three possible pieces of operational safety information. Expediently, a first operational safety information is displayed by lighting the first operational safety LED 21 (and not lighting the second operational safety LED 22 and third operational safety LED 23), second operational safety information is displayed by lighting the second operational safety LED 22 (and not lighting the first operational safety LED 21 and third operational safety LED 23) and third operational safety information is displayed by lighting the third operational safety LED 23 (and not lighting the first operational safety LED 21 and second operational safety LED 23).

The operational safety display 8 is designed especially as a traffic light display. The traffic light display may also be referred to as stop light display. As an example, the first operational safety LED 21 is designed to light green, the second operational safety LED 22 is designed to light yellow and the third operational safety LED 23 is designed to light red.

The first operational safety information is expediently represented by a green light, the second operational safety information by a yellow light and the third operational safety information by a red light.

As an alternative to the design explained above, the assistance device 10 may also be designed to display the operational safety information as one of exactly two possible pieces of operational safety information. Further, the operational safety display 8 may expediently comprise only one or two operational safety LEDs and be designed to display the operational safety information, in particular exactly two or exactly three different pieces of operational safety information, by means of the one or two operational safety LEDs.

As an example, the adjustment recommendation display 16 includes two adjustment recommendation LEDs, in particular exactly two adjustment recommendation LEDs. The adjustment recommendation display 16 exemplarily includes a first adjustment recommendation LED 24 and a second adjustment recommendation LED 25.

The assistance device 10, in particular the adjustment recommendation display 16, is designed to display the adjustment recommendation as one of exactly two or three possible adjustment recommendations. Expediently, a first adjustment recommendation is displayed by lighting the first adjustment recommendation LED 24 (and not lighting the second adjustment recommendation LED 25), a second adjustment recommendation is displayed by lighting the second adjustment recommendation LED 25 (and not lighting the first adjustment recommendation LED 24). A third adjustment recommendation (or the case where no adjustment recommendation is to be displayed) is expediently displayed by not lighting the first adjustment recommendation LED 24 and not lighting the second adjustment recommendation LED 25.

Exemplarily, at each adjustment recommendation LED 24, 25 a direction of rotation is shown by a respective marker 26, especially an arrow. Expediently, the direction of rotation shown corresponds to the direction of rotation with which an operating element is to be operated when adjusting the damping choke 1.

The display arrangement 3 further includes, as an example, a supply voltage LED 27 which expediently lights up when the assistance device 10 is supplied with a supply voltage.

The assistance device 10 expediently includes a sensor device 28 which serves to detect the movement of the actuator member 4. The assistance device 10 is especially adapted to detect, by means of the sensor device 28, the position of the actuator member 4 along the movement path 7. Expediently, the assistance device 10 is adapted to successively detect, by means of the sensor device 28, several position values relating to the position of the actuator member 4. The sensor device 28 expediently comprises one or more sensor elements, in particular magnetic sensor elements. On the actuator member 4, a magnet 32 is exemplarily present, the magnetic field of which is detected by the sensor device 28 in order to determine the position of actuator member 4. The assistance device 10 is expediently adapted to calculate velocity and/or acceleration values on the basis of the detected position values, for example by calculating the derivative or difference of the position values.

The assistance device 10 further comprises a control unit 29, which is exemplarily designed as a microcontroller. The control unit 29 serves in particular to read out the sensor device 28, to determine the adjustment recommendation, to determine the operational safety information and/or to control the display arrangement 3.

The assistance device 10 further comprises a voltage and/or data interface 31 for applying a supply voltage and/or exchanging data.

FIG. 2 shows an arrangement 20, which includes the assistance device 10 and the fluidic actuator 30. The assistance device 10 is shown here in an intended use, in which the assistance device 10 is placed on the fluidic actuator 30.

The fluidic actuator 30 is exemplarily designed as a pneumatic actuator. The fluidic actuator 30 comprises in particular a drive cylinder. The fluidic actuator 30 comprises a preferably cylindrical actuator body 33. The assistance device 10 is placed externally on the cylindrical actuator body 33, in particular attached to it, expediently with the underside of the assistance device 10. The assistance device 10 is arranged in particular in the region of an end position 14 of the fluidic actuator 30, so that the movement of the actuator member 4 in the region of this end position can be detected with the assistance device 10.

The end position 14 is defined by an end stop 2.

The fluidic actuator 30 comprises the actuator member 4, which can be moved relative to the actuator body 33, along the movement path 7. The actuator member 4 can be moved in particular to the end position 14. As an example, in this state (i.e. in the end position 14), the actuator member 4 is maximally retracted into the actuator body 33 and/or contacts the end stop 2 defining the end position 14. The actuator member 4 exemplarily comprises a piston 34 and a piston rod 35.

Exemplarily, the actuator member 4 is coupled to an external load 5, in particular via the piston rod 35, so that the external load 5 moves with the actuator member 4 when the actuator member 4 moves. The external load 5 is a drive object, for example a machine part, a tool and/or a workpiece, which is to be set in motion by means of the fluidic actuator 30. When the actuator member 4 is moved, the total mass moved is the sum of the mass of the actuator member 4 and the mass of the external load 5. Expediently, this total mass is taken as the basis for determining the operational safety information, in particular for calculating the kinetic energy.

The fluidic actuator 30 comprises exemplarily a first pressure chamber 36 and a second pressure chamber 37. Exemplarily, the piston 34 divides an inner space of the fluidic actuator 30 into the first and second pressure chambers 36, 37. By pressurizing the second pressure chamber 37, expediently when the pressure in the first pressure chamber 36 is released, the pressure difference between the two pressure chambers 36, 37 causes a driving force on the actuator member 4, which moves the actuator member 4 in the direction towards the first pressure chamber 36 (to the left in the figure). This movement shall also be referred to as movement in a first movement direction and/or as retraction movement. A movement in the opposite direction shall be referred to as movement in a second movement direction.

The fluidic actuator 30 includes the damping choke 1, by which the pressure release from the first pressure chamber 36 can be influenced. For example, the damping choke 1 is located in a fluidic channel leading out of the first pressure chamber 36 and determines a channel cross section through which the pressurized fluid flowing out of the first pressure chamber 36 flows. The damping choke 1 can be used to adjust how much the actuator member 4 is damped—i.e. especially braked—in its movement in the first movement direction. The further the damping choke 1 is opened, the less the actuator member 4 is braked. The further the damping choke 1 is closed, the more the actuator member 4 is braked.

Expediently, the damping of the movement of actuator member 4 by the damping choke is effective in the region of the end position 14, preferably only in this region.

The movement of the actuator in the end position range, in particular towards end position 14, shall also be referred to as damped movement, braking movement and/or end position movement of actuator member 4.

It is typically desired that the movement of the actuator member 4 when retracting into the end position 14 is damped by the damping choke 1 to such an extent that a (hard) impact of the actuator member 4 on the end stop 2 defining the end position 14 is prevented. At the same time, the damping should typically not be so strong that actuator member 4 stops too far before the end position 14.

The assistance device 10 serves to detect and evaluate the movement, in particular the end position movement, of the actuator member 4 and to inform the user by means of the adjustment recommendation and the operational safety information, how the damping choke 1 should be adjusted and/or how safe the current operation is.

In the following, the determination of the operational safety information will be described in more detail. As mentioned above, the operational safety information is based on the kinetic energy (in particular the total mass of actuator member 4 and/or external load 5) associated with the current velocity and is intended in particular to inform the user of the safety of the current adjustment of the damping choke 1 and/or the current operation of the arrangement 20. Expediently, the assistance device 10 outputs as the operational safety information one of the three evaluations "optimal", "acceptable" and "unsafe". The operational safety information "acceptable" can also be referred to as "acceptable and slightly recoil-afflicted". The operational safety information "optimal" can also be described as "acceptable and recoilless". The operational safety information "optimal" is displayed, for example, by the green light, the operational safety information "acceptable" by the yellow light and the operational safety information "unsafe" by the red light by means of the display arrangement 3.

Preferably the assistance device 10 is adapted to calculate the kinetic energy associated with the movement of the actuator member 4, i.e. in particular the sum of the kinetic energy of the actuator member 4 and (if an external load 5 is present) the kinetic energy of the external load 5. In particular the assistance device 10 is adapted to calculate the kinetic energy effective on impact of the actuator member 4 on the end position 14. Expediently, this is an estimate and not an exact calculation.

The assistance device 10 is expediently adapted to compare the calculated kinetic energy with a threshold and to provide the operational safety information on the basis of the comparison. Preferably, if the threshold is exceeded, the operational safety information "unsafe" is provided and if the threshold is not reached, the operational safety information "acceptable" or "optimal" is provided.

Expediently, the assistance device 10 is adapted to determine the threshold on the basis of the type and/or on the basis of a dimension of the actuator 30. For example, the assistance device 10 is adapted to obtain type information describing the type of actuator 30 and/or dimension information describing a dimension of the actuator 30 and to provide the threshold on the basis of the type information and/or the dimension information, expediently by using a look-up table. The dimension information expediently comprises a diameter and/or a length of the actuator 30, in particular of the actuator member 4. Preferably the dimension information comprises a stroke of the actuator 30. Expediently the assistance device 10 is adapted to store and/or receive dimension information (for determining the threshold) expediently via the voltage and/or data interface 31 and/or via a user interface. As an example, during operation of the assistance device 10, the dimension information is transferred and/or entered into the assistance device 10, in particular by a user.

As an alternative or in addition, the assistance device 10 is adapted to store and/or receive the threshold, expediently via the voltage and/or data interface 31 and/or via a user interface. As an example, when the assistance device 10 is in operation, the threshold is transferred and/or entered into the assistance device 10, in particular by a user.

The assistance device 10 is preferably adapted to calculate the kinetic energy as $½*m*v^2$, where m denotes the mass of the moving assembly, for example the mass of the actuator member 4 and the external load 5, and v denotes the velocity of the actuator member 4 (in particular just before the end position 14).

The assistance device 10 is in particular adapted to determine the operational safety information, in particular the kinetic energy, by taking into account the mass of the actuator member 4 and/or the mass of the external load 5. Expediently, this is the kinetic energy currently being driven.

As an alternative or in addition, the assistance device 10 is adapted to determine the operational safety information, in particular the kinetic energy, by taking into account a type of actuator 30 and/or a dimension of the actuator 30. Expediently, this is the kinetic energy currently being driven and/or a permissible kinetic energy, e.g. a threshold for the kinetic energy.

Expediently, the assistance device 10 is adapted to store and/or receive mass information (for the calculation of the kinetic energy), expediently via the voltage and/or data interface 31 and/or via a user interface. As an example, during operation of the assistance device 10, the mass information is transferred and/or entered into the assistance device 10, in particular by a user.

As an alternative or in addition, the assistance device 10 is adapted to determine the mass information, in particular of the actuator member 4, on the basis of the type and/or on the basis of a dimension of the actuator 30. For example, the assistance device 10 is adapted to obtain type information describing the type of actuator 30 and/or dimension information describing a dimension of the actuator 30 and to provide the mass information based on the type information and/or the dimension information, expediently by using a look-up table. The dimension information expediently includes a diameter and/or length of the actuator 30, especially of the actuator member 4. Preferably the dimension information includes a stroke of the actuator 30.

Expediently, the assistance device 10 is adapted to store and/or receive dimension information (for the calculation of the kinetic energy), preferably via the voltage and/or data interface 31 and/or via a user interface. As an example, during operation of the assistance device 10, the dimension information is transferred and/or entered into the assistance device 10, in particular by a user.

The assistance device 10 is expediently adapted to insert the mass information as m into the equation $½*m*v^2$ in order to calculate the kinetic energy.

The assistance device 10 is expediently adapted to detect the velocity of actuator member 4 when the actuator member 4 is at a predetermined position 6 and to determine the operational safety information on the basis of the velocity detected at the predetermined position 6. Expediently, the predetermined position 6 is stored in the assistance device 10, in particular in advance, i.e. before the velocity is recorded. Alternatively or additionally, the predetermined position 6 is automatically taught in during a first learning run. Expediently, the predetermined position 6 is in the region of the end position 14.

The assistance device 10 is in particular adapted to calculate the kinetic energy on the basis of the velocity detected in the predetermined position 6. The assistance device 10 is expediently adapted to insert the detected velocity as v into the equation $½*m*v^2$ in order to calculate the kinetic energy.

According to a preferred embodiment, the assistance device 10 is adapted to detect, on the basis of the movement of the actuator member 4, especially on the basis of the end position movement, a movement characteristic 9 and to determine the operational safety information on the basis of the movement characteristic 9. The movement characteristic 9 comprises a rebound 11, an oscillation 12 and/or a standstill of the actuator member 4.

Figure 6:
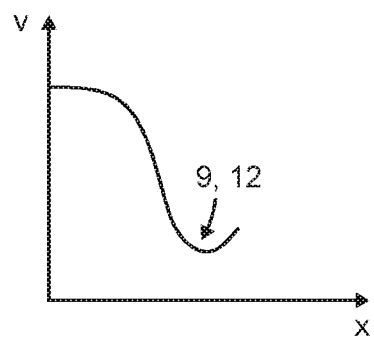
Figure 7:
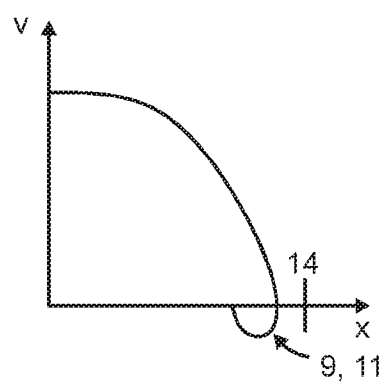
Figure 8:
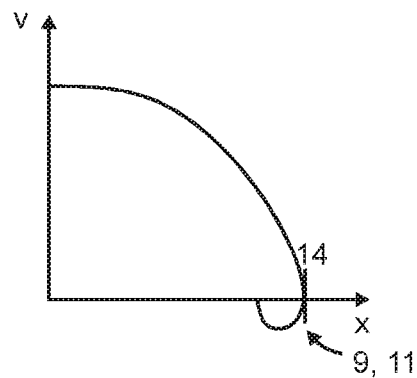

Examples of the movement characteristic 9 are shown in FIGS. 6, 7 and 8. FIGS. 6, 7 and 8 each show the velocity v of the actuator member 4 as a function of the position x of the actuator member.

In FIG. 6, the actuator member 4 moves in the first movement direction, wherein (due to the damping choke 1) the acceleration is initially negative, so that the velocity continues to decrease. Acceleration then becomes positive, so that the velocity increases again, especially before reaching the end position 14. The velocity curve thus shows a local minimum. Expediently, the assistance device 10 is adapted to detect the local minimum on the basis of a change of sign of the acceleration. The assistance device 10 is in particular adapted to determine the presence of the movement characteristic 9 on the basis of the change of sign of the acceleration and/or on the basis of the local minimum. Here, the movement characteristic is an oscillation 12, for example.

In FIGS. 7 and 8, the actuator member 4 moves in the first movement direction, wherein (due to the damping choke 1) the acceleration is negative, so that the velocity decreases continuously. Finally, the velocity becomes negative so that actuator member 4 moves in a second movement direction—i.e. opposite to the first movement direction. The assistance device 10 is expediently adapted to detect the movement characteristic 9 on the basis of the negative velocity, in particular on the basis of a change of sign of the velocity. Here, the movement characteristic 9 is a rebound of the actuator member 4.

In FIG. 7 the rebound occurs before the end position 14 and in FIG. 8 the rebound occurs in the end position 14.

The assistance device 10 is expediently adapted to display the information "acceptable"—i.e. in particular a yellow light—on the basis of a detected presence of the movement characteristic 9. Furthermore, the assistance device 10 is adapted to display the information "optimal"—i.e. in particular a green light—on the basis of a detected non-presence of the movement characteristic 9.

Figure 3:
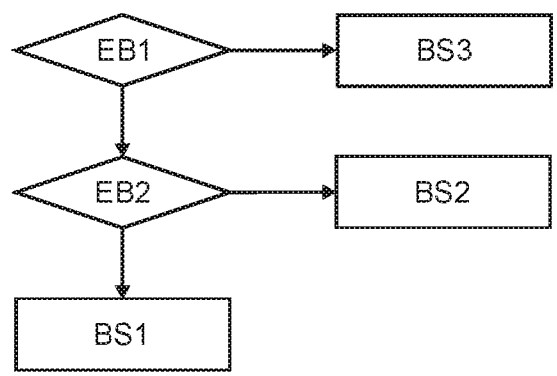

FIG. 3 shows an exemplary first decision diagram illustrating how the assistance device 10 decides, depending on the kinetic energy and the movement characteristic 9, which operational safety information should be displayed.

In accordance with the first decision block EB1, the assistance device 10 expediently checks whether the calculated kinetic energy is above the threshold. If this is the case, the assistance device 10 determines the third operational safety information BS3, exemplarily the information "unsafe", as the operational safety information to be displayed.

According to a second decision block EB2, the assistance device 10 expediently checks whether a movement characteristic 9—i.e. the oscillation 12, the rebound 11 and/or the standstill (especially before the end position 14)—is present. Expediently, this check is carried out if the kinetic energy is below the threshold.

If a movement characteristic 9 is present, the assistance device 10 determines the second operational safety information BS2, exemplarily the information "acceptable", as the operational safety information to be displayed.

If no movement characteristic 9 is present—e.g. no oscillation 12, no rebound 11 and/or no standstill (especially before the end position 14)—the assistance device 10 determines the first operational safety information BS1, exemplarily the information "optimal", as the operational safety information to be displayed.

In the following, the determination of the adjustment recommendation will be discussed in more detail.

The assistance device 10 is expediently adapted to determine the adjustment recommendation on the basis of the movement characteristic 9 and/or on the basis of the operational safety information.

Preferably, the assistance device 10 is adapted to detect that a rebound 11 of the actuator member 4 occurs before the end position 14 of the actuator member 4 and to determine the adjustment recommendation based on this detection. A rebound before the end position means that the actuator member 4 changes its movement direction before reaching the end stop 2. In this case, as the adjustment recommendation, in particular the recommendation "Open damping choke further" is determined. This adjustment recommendation is displayed by the second adjustment recommendation LED 25 lighting up as an example.

The assistance device 10 is expediently further adapted to detect that a rebound 11 of the actuator member 4 occurs at the end position 14 of the actuator member 4 and to determine the recommended adjustment on the basis of this detection. A rebound in the end position means that the actuator member 4 reaches the end stop 2 and bounces off it. In this case, as the adjustment recommendation, in particular the recommendation "Close damping choke further" is determined. This adjustment recommendation is displayed by the first adjustment recommendation LED 24 lighting up as an example.

If the damping choke 1 is closed too far, a fluid cushion is formed before the end position 14, which the actuator member 4 bounces off. Thus, a rebound occurs before reaching the end position 14. FIG. 7 shows an example of such a rebound before reaching the end position 14.

If the damping choke 1 is opened too far, then the actuator member 4 is braked too little, so that the actuator member 4 reaches the end position 14 at increased velocity and bounces off at the end position 14, so that a rebound occurs in the end position 14—i.e. when the end position is reached. FIG. 8 shows an example of such a rebound when reaching the end position 14.

The assistance device 10 is adapted to determine the adjustment recommendation on the basis of the operational safety information.

Expediently, the assistance device 10 is adapted to display the adjustment recommendation "Close damping choke further" based on the determination of the operational safety information "unsafe".

Figure 4:
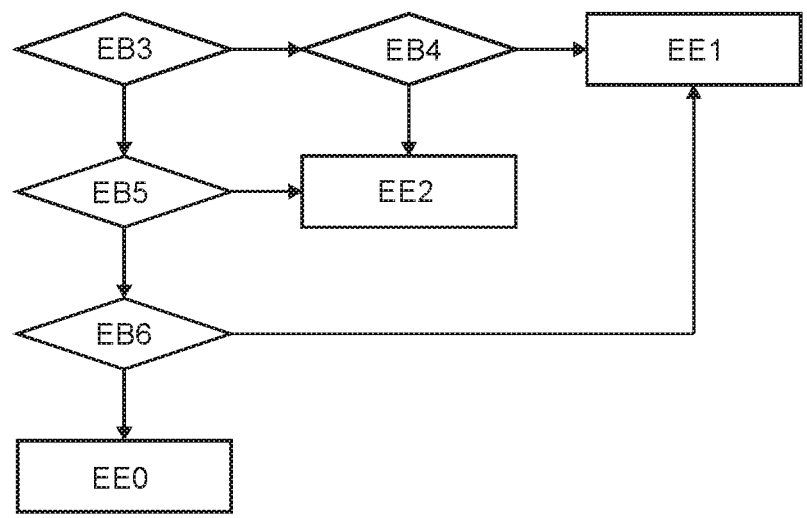

FIG. 4 shows an exemplary second decision diagram illustrating how the assistance device 10 decides, depending on the movement characteristic 9 and the operational safety information, which adjustment recommendation is to be displayed.

In accordance with the third decision block EB3, the assistance device 10 expediently checks whether a rebound of the actuator member 4 has been detected as the movement characteristic 9. If this is the case, the assistance device 10 checks, in accordance with the fourth decision block EB4, whether the rebound of the actuator member 4 has occurred in the end position 14 or before the end position 14.

If the assistance device 10 detects a rebound in the end position 14, the assistance device 10 determines the first adjustment recommendation EE1, exemplarily the information "Close damping choke further", as the adjustment recommendation to be displayed.

If the assistance device 10 detects a rebound before the end position 14, the assistance device 10 determines the second adjustment recommendation EE2, exemplarily the information "Open damping choke further", as the adjustment recommendation to be displayed.

According to a fifth decision block EB5, the assistance device 10 expediently checks whether an oscillation 12 and/or a standstill (especially before the end position 14) is present as the movement characteristic 9. Expediently, this check is carried out if it has been determined in the third decision block EB3 that there is no rebound.

If an oscillation 12 and/or a standstill is present as the movement characteristic 9, the assistance device 10 determines the second adjustment recommendation EE2, exemplarily the information "Open damping choke further", as the adjustment recommendation to be displayed.

According to a sixth decision block EB6, the assistance device 10 expediently checks whether the operational safety information is "unsafe"—i.e. whether the kinetic energy is above the threshold. Expediently, this check is performed if it was determined in the fifth decision block EB5 that no oscillation 12 and/or no standstill (in particular before the end position 14) is present.

If the operational safety information is "unsafe", the assistance device 10 determines the first adjustment recommendation EE1, exemplarily the information "Close damping choke further", as the adjustment recommendation to be displayed.

If the operational safety information is not "unsafe"—i.e. exemplarily "optimal" or "acceptable and recoilless"—the assistance device 10 determines the adjustment recommendation EE0—namely that the current adjustment of the damping choke 1 is optimal. Expediently, in this case, a display of an adjustment recommendation does not take place. Preferably, in this case, both adjustment recommendation LEDs 24 and 25 are not lightened.

Figure 5:
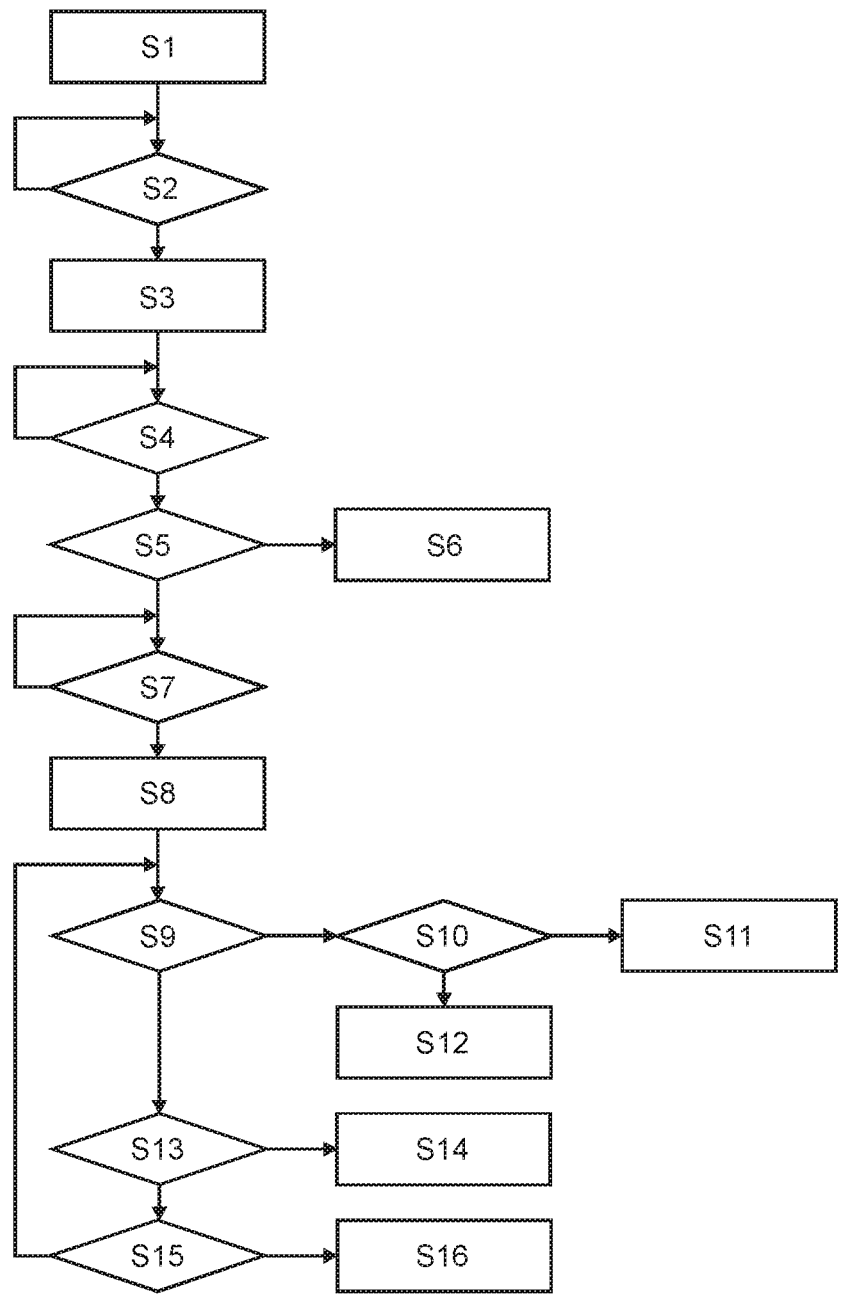

In the following, with reference to FIG. 5, an exemplary procedure will be described with which the state information required for determining the operational safety information and the adjustment recommendation can be determined. The procedure is expediently performed by the assistance device 10.

In step S1 the acquisition of sensor values, especially sensor values of the sensor device 28, begins.

In step S2, the detected sensor values are used to check whether the actuator member 4, in particular the magnet 32 attached to the actuator member 4, is within the detection range of the sensor device 28. In particular, it is therefore checked whether a position of the actuator member 4 can be detected using the sensor values. Step S2 is repeated until it is detected that the actuator member 4 is within the detection range of the sensor device 28.

In step S3, velocity values of the actuator member 4 are calculated on the basis of the detected sensor values, in particular on the basis of the detected position values of the actuator member 4. A velocity value of the actuator member 4 is stored as the maximum velocity value.

In step S4 it is checked whether a signal evaluation is to be started. Step S4 is expediently repeated until the check result is positive. As an example, current velocity values of the actuator member 4 and the maximum velocity value are used to check whether signal evaluation should be started. Expediently, the signal evaluation is started when a current velocity value of the actuator member 4 falls below a predetermined fraction—for example half—of the maximum velocity value.

In step S5, it is checked whether the oscillation 12 is present, in particular in the manner already explained above—namely whether a local minimum is present. If the oscillation 12 is present, this is registered as state information in step S6.

In step S7 it is checked whether the velocity of the actuator member is zero or has passed the zero value. Step S6 is repeated until the velocity of the actuator member is zero or has passed the zero value.

At step S8 a timer is started, exemplarily with a time value of 200 ms.

In step S9 it is checked whether a rebound is present. In particular, this involves checking whether the distance covered by the actuator member 4 in the second movement direction is greater than a predetermined rebound threshold.

In step S10 it is checked whether the rebound has occurred before or in the end position 14. If the rebound has occurred before the end position 14, this is registered as state information in step S10. If the rebound has occurred in the end position 14, this is registered as state information in step S11.

If no rebound is detected, it is checked in step S13 whether a standstill has occurred before reaching the end position 14. If this is the case, this is registered as state information in step S14.

If no standstill is detected, it is checked in step S15 whether the timer has expired. If this is the case, then the procedure is terminated with step S16, in which it is registered as state information that there is no rebound and no standstill. If the timer has not yet expired, the procedure returns to step S9.

By means of the procedure, the state information required for determining the operational safety information and/or the adjustment recommendation, can be acquired, in particular whether a movement characteristic 9—i.e. an oscillation 12, a rebound and/or a standstill (before the end position 14)—is present. Furthermore, by means of the procedure it can be determined whether the rebound occurred before or in the end position 14.

Expediently, the assistance device 10 is adapted to detect rebound using a range of tolerance. A very small rebound, i.e. a rebound in which the actuator member moves only very little in the second movement direction, is expediently not considered a rebound. Expediently, the assistance device 10 is adapted to check whether the distance the actuator member moves in the second movement direction after the rebound is less than a predetermined rebound threshold and, if so, to record as state information that no rebound has occurred.

Expediently, the assistance device 10 is adapted to perform the procedure in real time. Preferably, the assistance device 10 is adapted to store, at all time during the execution of the procedure, only a (current) part of the velocity and/or position curve of the actuator member 4. Preferably, the assistance device 10 does not store the entire velocity and/or position curve of the deceleration movement of the actuator member 4. Expediently, the assistance device 10 is adapted to store the position and/or velocity values acquired for the procedure in a ring memory. The ring memory is expediently smaller than the data amount of the total of position values and/or velocity values which represent the entire deceleration movement of the actuator member 4.

Further exemplary details are explained below.

The damping choke 1 is expediently a bypass throttle. The damping choke 1 can be set, in particular, by several turns. The damping choke 1 may also be referred to as damping throttle.

In a state in which the operational safety information is "optimal" and/or no adjustment recommendation is provided, the deceleration movement of the actuator member 4 expediently exhibits (as far as possible) aperiodic braking behavior. An aperiodic braking behavior is in particular present if the deceleration process takes place in a main braking phase without reversing acceleration. Furthermore, in the state in which the operational safety information "optimal" and/or no adjustment recommendation is provided, the acceleration of the actuator member 4 can be slightly positive in an end position region. At the same time the permissible kinetic energy must not be exceeded.

The assistance device 10 serves in particular to assist a user in adjusting a manually adjustable pneumatic end-position damping. In operation, the user inserts the assistance device 10 exemplarily into a cylinder groove at one stroke end of the actuator 30 during adjustment of the damping choke 1 and then removes the assistance device 10 (after adjustment). The assistance device 10 is, in particular, a mobile device which can be used expediently for successively adjusting an unlimited number of end position dampings.

Optionally, the assistance device can have a connecting cable to connect the sensor device 28 to external electronics, especially for use with a small fluidic actuator 30, for example a small cylinder.

Expediently, the assistance device 10 has a data interface, for example Bluetooth, WLAN and/or USB. For example, the data interface is part of the voltage and/or data interface 31.

Expediently, the assistance device may be connected via the data interface to a smartphone or laptop computer which is used to implement diagnostic functions, in particular one or more of the following functions: Graphical representation of the position curve of the actuator member 4 as a function of time, graphical representation of the velocity curve of the actuator member 4 as a function of time, graphical representation of the velocity curve of the actuator member 4 as a function of position and/or display of the kinetic energy as a numerical value.

Expediently, the assistance device 10 is adapted to receive input parameters via the data interface for determining the operational safety information and/or the adjustment recommendation. For example, the assistance device 10 is adapted to receive via the data interface as input parameters a cylinder type, diameter, stroke and/or a moving mass of the external load 5. Expediently, the assistance device 10 has a stored lookup table which is then used to determine, based on one or more input parameters, the permissible kinetic energy and/or a total moving mass to be used for the determination of the kinetic energy.

What is claimed is:

1. An assistance device for assisting in the adjustment of a damping choke of a fluidic actuator, wherein the assistance device is adapted to be placed externally on a cylindrical actuator body of the fluidic actuator having an actuator member which is movable relative to the actuator body,
   wherein the assistance device comprises a display arrangement and is adapted to determine, on the basis of a detected movement of the actuator member of the fluidic actuator, an adjustment recommendation for the adjustment of the damping choke and to display the adjustment recommendation via the display arrangement, and
   wherein the assistance device is further adapted to determine, based on the movement of said actuator member, operational safety information based on kinetic energy related to the movement of said actuator member, and to display said operational safety information via said display arrangement, and
   wherein the assistance device comprises a sensor device for detecting the movement of the actuator member, wherein the sensor device comprises one or more magnet sensor elements for detecting a magnetic field of a magnet of the actuator member in order to detect the movement of the actuator member.

2. The assistance device according to claim 1, wherein the assistance device is adapted to calculate the kinetic energy related to the movement of the actuator.

3. The assistance device according to claim 1, wherein the assistance device is adapted to determine the operational safety information taking into account a mass of the actuator member and/or a mass of an external load, a type of the actuator and/or a dimension of the actuator.

4. The assistance device according to claim 1, wherein the assistance device is adapted to detect the velocity of the actuator member when the actuator is located at a predetermined position and to determine the operational safety information based on the velocity detected at the predetermined position.

5. The assistance device according to claim 1, wherein the assistance device is adapted to display the operational safety information as one of exactly two or exactly three possible pieces of operational safety information.

6. The assistance device according to claim 1, wherein the display arrangement comprises an operational safety display designed as a traffic light display for displaying the operational safety information.

7. The assistance device according to claim 1, wherein the assistance device is adapted to detect, on the basis of the movement of the actuator member, a movement characteristic comprising a rebound, an oscillation and/or a standstill of the actuator member, and to determine, on the basis of the movement characteristic, the operational safety information and/or the adjustment recommendation.

8. The assistance device according to claim 1, wherein the assistance device is adapted to detect that a rebound of the actuator member occurs before an end position of the actuator member and to determine the adjustment recommendation on the basis of this detection.

9. The assistance device according to claim 1, wherein the assistance device is adapted to distinguish whether a rebound of the actuator member occurs in an end position of the actuator member or before the end position and to determine the adjustment recommendation on the basis of this distinction.

10. The assistance device according to claim 1, wherein the assistance device is adapted to determine the adjustment recommendation on the basis of the operational safety information.

11. The assistance device according to claim 1, wherein the assistance device is adapted to detect, on the basis of the movement of the actuator member, an oscillation of the actuator member, and to determine, on the basis of the detected oscillation, the operational safety information and/or the adjustment recommendation.

12. The assistance device according to claim 11, wherein the assistance device is adapted to detect the oscillation based on a local velocity minimum contained in a velocity curve of the actuator member.

13. The assistance device according to claim 1, wherein the assistance device is configured to display said operational safety information via said display arrangement simultaneously to and separately from the adjustment recommendation.

14. The assistance device according to claim 1, wherein the display arrangement comprises an operational safety display for displaying the operational safety information and an adjustment recommendation display for displaying the adjustment recommendation.

15. The assistance device according to claim 14, wherein the operational safety display comprises a first operational safety LED for displaying a first operational safety information, a second operational safety LED for displaying a second operational safety information, and a third operational safety LED for displaying a third operational safety information.

16. The assistance device according to claim 14, wherein the adjustment recommendation display comprises a first adjustment recommendation LED for displaying a first adjustment recommendation and a second adjustment recommendation LED for displaying a second adjustment recommendation.

17. A method of operating an assistance device for assisting in the adjustment of a damping choke of a fluidic actuator having an actuator body and a cylindrical actuator member movable relative to the actuator body, wherein the assistance device comprises a display arrangement and is adapted to determine, on the basis of a detected movement of the actuator member of the fluidic actuator, an adjustment recommendation for the adjustment of the damping choke and to display the adjustment recommendation via the display arrangement, and the assistance device is further adapted to determine, based on the movement of said actuator member, operational safety information based on kinetic energy related to the movement of the actuator member, and to display said operational safety information via said display arrangement, the method comprising the steps:

placing the assistance device externally on the cylindrical actuator body, detecting a movement of the actuator member by detecting a magnetic field of a magnet of the actuator member using one or more magnet sensor elements of a sensor device of the assistance device, determining, based on the detected movement of the actuator member, the operational safety information, and displaying the operational safety information via the display arrangement.

\* \* \* \* \*